United States Patent [19]
Nishimura

[11] Patent Number: 4,829,342
[45] Date of Patent: May 9, 1989

[54] MOVING STATE DETECTION APPARATUS

[75] Inventor: Tetsuharu Nishimura, Kawasaki, Japan

[73] Assignee: Canon Kabushiki Kaisha, Tokyo, Japan

[21] Appl. No.: 880,207

[22] Filed: Jun. 30, 1986

[30] Foreign Application Priority Data

Jul. 3, 1985 [JP] Japan ................... 60-146169

[51] Int. Cl.⁴ .............................................. G01B 9/02
[52] U.S. Cl. ........................ 356/356; 250/231 SE; 250/237 G
[58] Field of Search ............. 356/351, 354, 355, 356; 250/231 SE, 237 G

[56] References Cited

U.S. PATENT DOCUMENTS

| | | | |
|---|---|---|---|
| 3,601,490 | 8/1971 | Erickson | 356/351 |
| 4,436,424 | 3/1984 | Bunkenburg | 356/358 X |
| 4,676,645 | 6/1987 | Taniguchi et al. | 356/363 X |

*Primary Examiner*—Davis L. Willis
*Assistant Examiner*—Matthew W. Koren
*Attorney, Agent, or Firm*—Fitzpatrick, Cella, Harper & Scinto

[57] ABSTRACT

There is disclosed a moving state detection apparatus comprising optical unit for superposing a light beam of a specific order diffracted by a diffraction grating with a nondiffracted reference light beam; and light-receiving unit for receiving the superposed light beam from the optical means, the light-receiving unit being adapted to detect a change in contrast of interference fringes upon movement of said diffraction grating, and detect a moving state of the diffraction grating.

15 Claims, 1 Drawing Sheet

MOVING STATE DETECTION APPARATUS

BACKGROUND OF THE INVENTION

1. Field of the Invention

The present invention relates to an apparatus for detecting a linear movement state or rotating state of an object and, more particularly, to a highly precise moving state detection apparatus utilizing the interference of light diffracted by a diffraction grating provided on a moving object.

2. Related Background Art

Photo-electric rotary encoders are conventionally used as a means for detecting a rotational speed and variations therein of rotating mechanisms in office equipment, such as a floppy-disk drive computer and a printer, an NC machine tool, the capstan motor of a VTR, a rotating drum, and the like.

A conventional photo-electric rotary encoder employs a so-called index scale system wherein a light projection means and a light-receiving means are arranged to oppose each other with a main scale and a stationary index scale sandwiched therebetween. The main scale is formed by arranging light-transmitting and light-shielding portions at equal angular intervals that the peripheral portion of a disk coupled to a rotating shaft. The index scale is formed by arranging the light-transmitting and light-shielding portions at the same angular intervals as in the main scale. According to this method, a signal in synchronism with the pitch of the adjacent light-transmitting and light-shielding portions of both scales can be obtained as the main scale is rotated. The obtained signal is subjected to frequency analysis to detect variations in the rotational speed of the rotating shaft. The smaller the pitches of the light-transmitting and light-shielding portions on both scales, the higher the detection precision. However, when the scale pitch is made to be small, the S/N ratio of the output signal from a light-receiving means is degraded by diffracted light, resulting in coarse detection. In order to prevent this, if a total number of light-transmitting and light-shielding portions of the main scale is fixed, thereby enlarging the intervals between the two portions to be increased to a point at which the light-receiving means is free from the effects of the diffracted light, the diameter and thickness of the disk of the main scale are increased, resulting in an increase in the overall apparatus size. Therefore, the object to be rotated is overloaded.

U.S. Pat. No. 3,726,595, and Japanese Patent Disclosure Nos. 190202/1982, 190203/1982, 207805/1982, and 98302/1985 disclose apparatuses each wherein a plurality of beams diffracted by a rotating diffraction grating are superposed to form interference fringes, and a displacement of the diffraction grating is measured by the change in contrast of the interference fringes. Such an apparatus utilizing interference of the diffracted beam enables higher precision measurement than that by the photoelectric encoder described above. However, in such an apparatus utilizing a plurality of diffracted beams, in order to form desired interference fringes on the photoelectrical detector, an optical system, which projects a coherent beam on the diffraction grating or superposes the beams diffracted by the diffraction grating on each other, must have a more precise arrangement, resulting in cumbersome assembly and adjustment.

SUMMARY OF THE INVENTION

The present invention has been made in view of the above conventional drawbacks, and has as its object to provide a highly precise moving state detection apparatus which has a simple configuration and which can easily obtain desired interference fringes.

To this end, the moving state detection apparatus according to the present invention is characterized by comprising: an optical means for superposing a beam of a specific order diffracted by a diffraction grating on a nondiffracted reference beam; and a light-receiving means for receiving the superposed beam from the optical means, wherein the light-receiving means detects a change in contrast of the interference fringes in accordance with a change in the moving state of the diffraction grating. When the signal obtained by photo-electrically converting the change in contrast of the interference fringes is used, the moving state of the diffraction grating, such as the displacement and moving speed, as well as its direction can be detected.

DETAILED DESCRIPTION OF THE PREFERRED EMBODIMENT

Figure 1:
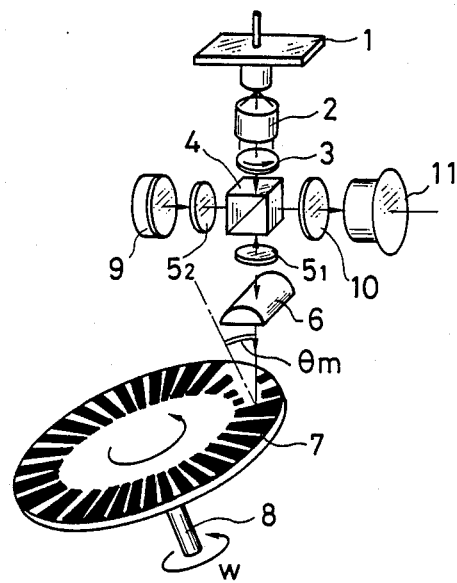
FIG. 1 is a schematic view of an optical system according to an embodiment of the present invention.

FIG. 1 is a schematic view of an embodiment of the present invention. In FIG. 1, a light source 1 such as a laser produces a coherent beam. The beam emitted from the light source 1 is linearly polarized light. A $\lambda/2$ plate 3 can be rotated in a plane perpendicular to the optical axis of a collimator lens 2. A polarizing beam splitter 4, $\lambda/4$ plates $5_1$ and $5_2$, and a cylindrical lens 6 are also provided. A radial diffraction grating (to be referred to as a radial grating hereinafter) 7 has a plurality of light-transmitting and light-shielding portions at equal angular intervals arranged on a disk. A rotating shaft 8 of an object to be rotated (not shown), a reflecting mirror 9, and a light-receiving element 11 are also provided. A polarizing plate 10 is arranged such that its polarizing axis is inclined by 45° with respect to the polarizing axis of the polarizing beam splitter 4.

The light beam emitted from the laser 1 is collimated by the collimator lens 2, and a substantially parallel light beam is incident on the polarizing beam splitter 4 through the $\lambda/2$ plate 3. The direction of linearly polarized light incident on the polarizing beam splitter 4 rotates in accordance with the rotational angle of the $\lambda/2$ plate 3. Therefore, the ratio of the amount of transmitted light beam to that of reflected light beam in the polarizing beam splitter 4 is adjusted by the rotation of the $\lambda/2$ plate 3, thereby improving the contrast of interference fringes to be described later. The light beam passing through the polarizing beam splitter 4 is changed to circularly polarized light by the $\lambda/4$ plate $5_1$, and is linearly incident on the radial grating 7 through the cylindrical lens 6. The cylindrical lens 6 is arranged to linearly guide the light beam in a direction perpendicular to the radial direction of the radial grating 7. With this linear radiation, a pitch error of the light-transmitting and light-reflecting pattern on the radial grating 7, which corresponds to the portion irradiated by the light beam, can be decreased.

Figure 2:
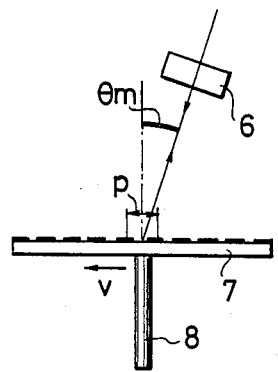
FIG. 2 is a sectional view showing part of the system in FIG. 1 on a plane perpendicular to the radial direction of a radial grating.

The light beam incident on the radial grating 7 is reflected and diffracted according to the pattern of the radial grating 7. In this embodiment, the incident angle of the beam on the radial grating 7 in a plane perpendicular to the radial direction of the grating 7, as shown in FIG. 2, is set to be $\theta_m$, which is determined by equation (1):

$$\sin \theta_m = m \lambda / 2p \quad (1)$$

where $\lambda$ is the wavelength of the light beam, p is the pitch of the grating pattern at the position of the light beam incident on the grating 7, and m is an integer of $\pm 1, \pm 2, \ldots$ When the incident angle $\theta_m$ is set as determined in equation (1), a reflected beam of the order of m, among the light beams diffracted by the radial grating 7, returns along the original light path. The diffracted beam passes through the cylindrical lens 6 and the $\lambda/4$ plate $5_1$ again so that the direction of the linearly polarized light is rotated through 90°, and the light beam is reflected by the polarizing beam splitter 4 and is incident on the light-receiving element 11 through the polarizing plate 10. Assume that the radial grating 7 is rotated at an angular speed $\omega$, and that a peripheral speed at the incident position is $v = r\omega$, where r is the distance from the center of rotation of the radial grating 7 to the incident position of the light beam. Therefore, the frequency of the reflected diffraction light beam of the order of m, which is incident at an incident angle $\theta_m$ and reflected at a reflective angle $\theta_m$, is subjected to so-called Doppler shift by an amount $\Delta f$ represented by equation (2):

$$\Delta f = 2v \sin\theta_m / \lambda \quad (2)$$

Meanwhile, the light beam emitted by the laser 1 and reflected by the polarizing beam splitter 4 through the collimator lens 2 and the $\lambda/2$ plate 3 is used as a so-called reference light beam. The reference light beam passes through the $\lambda/4$ plate $5_2$ to be circularly polarized, is reflected by the reflecting mirror 9, and passes through the $\lambda/4$ plate $5_2$ again, so that the direction of the polarized light is rotated through 90° to produce a linearly polarized light beam, and that the beam is transmitted through the polarizing beam splitter 4 and incident on the light-receiving element 11 through the polarizing plate 10. In this manner, the beam of the order of m and the reference beam reflected by the reflecting mirror 9 are superposed on the light-receiving element 11 and interfere with each other through the polarizing plate 10. The frequency of the light beam reflected by the reflecting mirror 9 is not subjected to the Doppler shift. Therefore, a frequency F of the output signal from the light-receiving element 11 is: $F = f + \Delta f - f = \Delta f$ (where f is the frequency of the light beam). In other words, substitution of $v = r\omega$ into equation (2) yields equation (3) below:

$$F = 2r\omega \sin\theta_m / \lambda \quad (3)$$

Substitution of equation (1) into equation (3) yields $F = mr\omega/p$. Assume that the total number of grating patterns on the radial grating 7 is N, and that the grating pitch p at a point distant from the center of the radial grating 7 by r is $2\pi r/N$. Therefore, when the object to be rotated is rotated at an angular speed of $\omega$, the frequency F of the output signal from the light-receiving element is:

$$F = mN\omega/2\pi \quad (4)$$

Since $n = F\Delta t$ and $\theta = \omega \Delta t$, $$n = mN\theta/\pi \quad (5)$$

where n is the number of waves of the output signal from the light-receiving element 11 during a time $\Delta t$, and $\theta$ is the rotational angle of the radial grating 7 during the time $\Delta t$. As a result, the rotational angle $\theta$ of the radial grating 7 can be calculated in accordance with equation (5) by counting the number n of waves of the output signal from the light-receiving signal 11.

Since relation $\theta = \omega \Delta t$ is established as described above, the angular speed $\omega = \theta / \Delta t$ can be calculated by calculating the rotational angle $\theta$ during the predetermined time $\Delta t$. The speed at the incident position of the coherent beam can also be calculated from relation $v = r\omega$.

When a diffracted beam of the 2nd order (m=2) is used as the reflected light, its light intensity generally tends to be very small. In order to prevent this, the rotatable $\lambda/2$ plate 3 is provided in this embodiment as a means for adjusting the ratio of the intensity of the light beam directed toward the radial grating 7 to that of the light beam directed toward the reflecting mirror 9, so that the detection precision of the rotational angle can be improved quickly. In other words, the ratio of the intensity of the transmitted light beam (the intensity of the light beam directed toward the radial grating 7) to that of the reflected light beam (the intensity of the light beam directed toward the reflecting mirror 9) in the polarizing beam splitter 4 is adjusted appropriately, by rotating the $\lambda/2$ plate 3. This prevents the decrease in the S/N ratio of the output signal from the light-receiving element 11.

Figure 3:
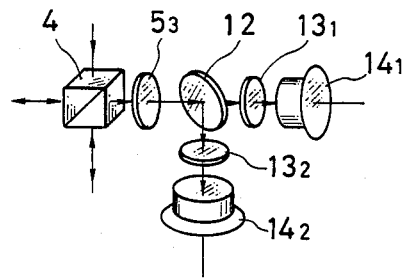
FIG. 3 is a schematic perspective view wherein part of FIG. 1 is improved to allow detection of the rotational direction.

It is preferable that the rotational direction be detected upon detection of the rotational angle. FIG. 3 is a partial view of an embodiment wherein such detection of the rotational direction is possible. In FIG. 3, a $\lambda/4$ plate $5_3$ and a beam splitter 12 are provided. Polarizing plates $13_1$ and $13_2$ are arranged such that their planes of polarization are shifted by an angle of 45° from each other. Light-receiving elements $14_1$ and $14_2$ are also provided. According to a known method of detecting the rotational direction in conventional photo-electric rotary encoders, a plurality of light-receiving elements are prepared and arranged such that the signals therefrom are 90° out of phase, and a signal representing the rotational direction is derived from the 90°-phase difference signals generated upon rotation.

In the embodiment of FIG. 3, the 90°-phase difference between the output signals from the light-receiving elements $14_1$ and $14_2$ is obtained by a combination of the polarizing beam splitter 12, the $\lambda/4$ plate $5_3$, and the polarizing plates $13_1$ and $13_2$. More specifically, the light beam reflected and diffracted by a radial grating 7 and that reflected by a reflecting mirror 9 are respectively reflected by and transmitted through a polarizing beam splitter 4 to be superposed with each other, and are then transmitted through the $\lambda/4$ plate $5_3$ to provide linearly polarized light. The direction of the polarized light changes upon rotation of the radial grating 7. When the planes of polarization of the polarizing plates $13_1$ and $13_2$ which are respectively provided before the light-receiving elements $14_1$ and $14_2$, are shifted from each other by 45°, the 90°-phase difference is provided between the output signals from the light-receiving elements $14_1$ and $14_2$.

According to the moving state detection apparatus of the present invention, a small, highly precise rotary encoder which gives only a small load to the object to be rotated can be achieved. When an adjustment means which can arbitrarily change the split ratio of the light beams is provided in a portion of the light beam split means, an even more precise rotary encoder can be achieved.

In a conventional photo-electric rotary encoder employing an index scale system, the relationship corresponding to equation (5), among the wave number n in an output signal from the light-receiving element, the total number N of the grating pattern of the main scale, and the rotational angle $\theta$, is:

$$n = N\theta/2\pi \quad (6)$$

Therefore, the rotational angle $\Delta\theta$ per wave in the conventional rotary encoder is:

$$\Delta\theta = 2\pi/N \text{ (radian)} \quad (7)$$

In contrast to this, in this embodiment, $$\Delta\theta = \pi/mN \text{ (radian)} \quad (3)$$

from equation (5). Therefore, according to this embodiment, the detection of a rotational angle can be performed with a precision 2 m times that of the conventional encoder, even using a scale of the same split number as the conventional encoder. In the conventional photo-electric rotary encoders, the lower limit of a gap between the light-transmitting and light-shielding portions is about 10 μm in view of the influence of the light diffraction. When the rotational angle detection precision of, e.g., 30 seconds is to be obtained, the split number N of the main scale must be $N = 360 \times 60 \times 60/30 = 43,200$ from equation (7). When the gap between the light-transmitting and light-shielding portions at the outermost periphery of the main scale is 10 μm, the diameter of the main scale must be 0.01 mm $\times$ 43,200/$\pi \times$ 137.5 mm.

In contrast to this, according to this embodiment, the split number of the radial grating can be ½ m to obtain the same rotational angle detection precision as the conventional encoder. When reflected, diffracted light of the 2nd order (m=2) is used, the split number of the pattern of the radial grating 7 can be 43,200/4 = 10,800 to provide a rotational angle detection precision of 30 seconds. The gap between the light-transmitting and light-shielding portions can be small if a diffracted laser beam is used as in this embodiment. Therefore, if this gap is 4 μm, the diameter of the radial grating is 0.004 mm $\times$ 10,800/$\pi$ = 13.75 mm. In other words, according to this embodiment, the diameter of the radial grating can be less than 1/10 that of the conventional one to obtain the same rotational angle detection precision as the conventional photo-electric rotary encoders employing the index scale system. As a result, the load to the object to be rotated becomes much smaller than in the conventional encoder, as well as allowing accurate measurement.

In the embodiment shown in FIG. 1, the radial grating 7 consists of light-transmitting and light-shielding portions. However, the radial grating 7 can consist of a phase-type diffraction grating transparent for the coherent beam to be used. Therefore, light of a specific order diffracted by the radial grating 7 can be reflected by a corner-cube prism or the like to be incident again on substantially the same position as the incident position of the coherent light beam, thereby obtaining re-diffraction light which interferes with the reference light obtained the reflecting mirror 9. In this case, the diffracted light forming the interference fringes is diffracted twice by the radial grating. A measurement apparatus using the interference fringes can have a resolution twice that of the embodiment of FIG. 1.

When the corner-cube prism is used in place of the reflecting mirror 9, a lot of attention need not be paid to the mounting precision. Even if the corner-cube prism is inclined, the light beam reflected thereby constantly travels the same optical path in the opposite direction, and is directed toward the polarizing beam splitter 4.

In the embodiment shown in FIG. 1, only a single diffracted light beam is used for forming the interference fringes. When such a diffracted light beam is obtained, attention need be paid only in inclining the optical axis of the optical system by a diffraction angle $\theta m$ of the mth order diffracted light. Excluding that, considerably less strict limitations are posed for the arrangement of other optical elements, when compared with the conventional apparatus. More specifically, a plurality of mirrors, which are conventionally used for precisely superposing the plurality of different diffracted light beams, are no longer needed, nor is cumbersome optical adjustment. Therefore, the entire apparatus can be constituted through a simple assembly and adjustment, and desired interference fringes for measurement can be formed easily on the surface of a detector. The desired interference fringes must have high contrast and an intensity which sufficiently satisfies the detection sensitivity of the detector.

In the above embodiment, the ratio of the intensity of the transmitted light beam and that of the reflected light beam in the polarizing beam splitter 4 is adjusted by the rotation of the $\lambda/2$ plate 3. However, the adjustment can be performed by rotating the coherent light source 1 about the optical axis of the collimator lens 2 so as to change the direction of the linearly polarized light.

When a semiconductor laser is used as the light source, the overall apparatus can be made compact. In addition, the laser beam emitted from the semiconductor laser generally has an elliptic beam spot. Therefore, when no cylindrical lens is used (unlike the encoder in FIG. 1) but the arrangements of the optical components are changed, the laser beam is incident on the diffraction grating such that the major axis of the ellipse of the laser beam becomes perpendicular to the aligning direction of the pattern of the diffraction grating. As a result, an error which occurs depending on a change in the grating pitch of the radial diffraction grating, i.e., the radial grating, can be decreased.

The moving state detection apparatus described with reference to FIGS. 1 to 3 is a so-called rotary encoder which detects the rotational angle or the rotational speed of a rotating object. However, it is apparent that the present invention can be applied to a linear encoder, for detecting a displacement or position of an object which moves linearly, or a length detector.

The diffraction grating (radial grating) shown in the above embodiment is a so-called amplitude-type diffraction grating which consists of light-transmitting and light-reflecting portions. However, a phase-type diffraction grating consisting of a rectangular relief pattern can be used, as described above. Since such a diffraction grating can be manufactured with a stamper, it can be obtained on a mass-production scale, resulting in a decrease in the total cost. When the phase-type diffraction grating is used in the apparatus of the embodiment shown in FIG. 1, a reflective film is formed on a relief pattern by vapor deposition. The diffraction grating used in the linear encoder described above need not be a radial grating, but can be of any type if the grating is formed in the direction of a predetermined pitch.

What is claimed is:

1. A rotating state detection apparatus comprising:
    a diffraction grating formed at a predetermined pitch on a peripheral portion of a rotating object and disposed in a plane parallel with a plane of rotation of said object;
    means for applying a light beam to said diffraction grating to create a diffracted light beam and producing a nondiffracted reference light beam which is capable of interfering with said diffracted light beam;
    optical means for superposing said diffracted light beam and said reference light beam to produce interference fringes; and
    light-receiving means for receiving the superposed light beams from said optical means, the rotating state of the rotating object being detected based on an output signal of said light-receiving means.

2. A moving state detection apparauts comprising:
    light source means for supplying a coherent light beam;
    beam splitting means for splitting said light beam into a plurality of light beams, a first light beam obtained by said splitting means being directed to a diffraction grating formed on an object, a second light beam obtained by said splitting means being directed to as location other than said diffraction grating, said diffraction grating being formed along a plane parallel with a plane in which said object moves relative to said first light beam;
    optical means for superposing a diffracted light beam created from said first light beam which is incident on said diffraction grating and said second light beam to produce interference fringes; and
    light-receiving means for receiving the superposed light beams from said optical means to photoelectrically convert said interference fringes, the moving state of said object relative to said first light beam being detected based on an output of said light-receiving means.

3. An apparatus according to claim 2, wherein said first light beam is converted into a linear light beam by an optical member and is directed to said diffraction grating.

4. An apparatus according to claim 3, wherein said optical member comprises a cylindrical lens.

5. An apparatus according to claim 2, wherein said light splitting means comprises adjustment means for arbitrarily changing a split ratio of the first and second light beams.

6. An apparatus according to claim 2, wherein said light splitting means consists of a rotatable $\lambda/2$ plate and a polarizing beam splitter for splitting a linear polarized light beam passed through said $\lambda/2$ plate.

7. An apparatus according to claim 6, wherein said second optical means comprises a polarizing plate.

8. An apparatus according to claim 2, wherein said first light beam is inclined by an angle which is substantially equal to a diffraction angle of said diffracted light beam, with respect to said diffraction grating.

9. A moving state detection method comprising the steps of:
    preparing first and second light beams which are capable of interfering with each other;
    forming a diffraction grating on an object movable relative to said first light beam and disposed in a plane parallel with a plane in which said object moves relative to said first light beam;
    producing a diffracted light beam by causing said first light beam to be incident on said diffraction grating;
    producing a non-diffracted reference light beam from said second light beam;
    producing interference fringes by superposing said diffracted light beam and said reference light beam; and
    detecting the moving state of said object relative to said first light beam by photoelectrically converting said interference fringes.

10. A method according to claim 9, wherein said object is a rotating object and said diffraction grating is formed in a plane parallel with a plane of rotation of said object.

11. A method according to claim 10, further comprising a step of converting said first light beam into a linear light beam and causing said first light beam to be incident on said diffraction grating in such a manner that a longitudinal direction of said linear light beam is substantially coincident with a direction in which said diffraction grating is arranged.

12. A method according to claim 9, wherein intensities of said first and second light beams are so set that constrast of said interference fringes is at a maximum.

13. An optical optical encoder comprising:
    a laser emitting a light beam;
    a diffraction grating formed on an object, said diffraction grating being arranged in a plane substantially parallel with a plane in which said object moves relative to the light beam;
    a beam splitter for splitting a light beam from said laser into first and second light beams to direct said first light beam to said diffraction grating and to direct said second light beam in a direction different from that of said first light beam and away from said diffraction grating;
    reflecting means for reflecting said non-diffracted second light beam to direct said non-diffracted second light beam back to said beam splitter; and
    means for photoelectrically converting interference fringes produced by said first light beam diffracted by said diffraction grating and said non-diffracted second light beam reflected by said reflecting means, said first and second light beams being superposed by said beam splitter and being received by said photoelectrical converting means, wherein a moving state of said object is detected based on an output signal of said photoelectrical converting means.

14. An optical encoder comprising:
    a semiconductor laser;
    optical means for directing a light beam having an elliptical cross-section from said laser to form a beam spot on a diffraction grating formed on an object, said diffraction grating being arranged in a plane substantially parallel with a plane in which said object moves relative to the light beam incident on said diffraction grating, and said optical means setting a direction of the major axis of said elliptical beam spot for reducing influence from a grating pitch error of said diffraction grating in the optical encoder, photoelectrical converting means for receiving an interference fringe formed by the light beam emitting from said diffraction grating, wherein a moving state of said object is detected based on an output signal of said photoelectrical converting means.

15. An optical encoder according to claim 14, wherein when said diffraction grating comprises a radial diffraction grating formed along a direction parallel with the rotational direction of the rotating object, said optical means directs the major axis of said elliptical beam spot to be substantially perpendicular to the radial direction of said diffraction grating.

* * * * *

UNITED STATES PATENT AND TRADEMARK OFFICE
CERTIFICATE OF CORRECTION

PATENT NO. : 4,829,342

DATED : May 9, 1989

INVENTOR(S) : Tetsuharu Nishimura

It is certified that error appears in the above-identified patent and that said Letters Patent is hereby corrected as shown below:

COLUMN 3:

Line 42, "the $\lambda/4$ plate 52" should read --the $\lambda/4$ plate $5_2$--.

Line 54, "reflecti,ng" should read --reflecting--.

COLUMN 6:

Line 8, "tained the" should read --tained by the--.

COLUMN 7:

Line 31, "apparauts" should read --apparatus--.

Line 39, "as" should read --a--.

UNITED STATES PATENT AND TRADEMARK OFFICE
CERTIFICATE OF CORRECTION

PATENT NO. : 4,829,342

DATED : May 9, 1989

INVENTOR(S) : Tetsuharu Nishimura

It is certified that error appears in the above-identified patent and that said Letters Patent is hereby corrected as shown below:

COLUMN 8:

Line 37, "constrast" should read --contrast--.

Line 38, delete "optical (second occurrence)

Signed and Sealed this

Fourth Day of September, 1990

Attest:

HARRY F. MANBECK, JR.

Attesting Officer

Commissioner of Patents and Trademarks